United States Patent
Honda

(10) Patent No.: US 10,406,748 B2
(45) Date of Patent: Sep. 10, 2019

(54) THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

(71) Applicant: TECHNOLOGY RESEARCH ASSOCIATION FOR FUTURE ADDITIVE MANUFACTURING, Tokyo (JP)

(72) Inventor: Kazuhiro Honda, Tokyo (JP)

(73) Assignee: TECHNOLOGY RESEARCH ASSOCIATION FOR FUTURE ADDITIVE MANUFACTURING, Tokyo (JP)

( * ) Notice: Subject to any disclaimer, the term of this patent is extended or adjusted under 35 U.S.C. 154(b) by 208 days.

(21) Appl. No.: 15/118,386

(22) PCT Filed: Dec. 25, 2015

(86) PCT No.: PCT/JP2015/086306
§ 371 (c)(1),
(2) Date: Aug. 11, 2016

(87) PCT Pub. No.: WO2017/109966
PCT Pub. Date: Jun. 29, 2017

(65) Prior Publication Data
US 2018/0009164 A1 Jan. 11, 2018

(51) Int. Cl.
*B33Y 10/00* (2015.01)
*B33Y 50/02* (2015.01)
(Continued)

(52) U.S. Cl.
CPC .......... *B29C 64/147* (2017.08); *B22F 3/1055* (2013.01); *B29C 64/153* (2017.08);
(Continued)

(58) Field of Classification Search
CPC .............................. B29C 64/147; B33Y 30/00
(Continued)

(56) References Cited

U.S. PATENT DOCUMENTS 6,054,192 A 4/2000 Otsuka et al.
6,215,095 B1 4/2001 Partanen et al.
(Continued)

FOREIGN PATENT DOCUMENTS

DE 10 2005 014 483 A1 10/2006
JP 10-211658 A 8/1998
(Continued)

OTHER PUBLICATIONS

Machine translation of JP2001-047520.*
(Continued)

*Primary Examiner* — Robert C Dye
*Assistant Examiner* — Russell E Sparks
(74) *Attorney, Agent, or Firm* — Ladas & Parry LLP

(57) ABSTRACT

A three-dimensional shaped object using a plurality of materials can be shaped, and replenishment of the materials is implemented during shaping without stopping an apparatus. A three-dimensional laminating and shaping apparatus includes a shaping chamber in which a three-dimensional laminated and shaped object is shaped, at least two material spreaders that are provided in the shaping chamber and spread materials of the three-dimensional laminated and shaped object, at least two material suppliers that supply the materials to the material spreaders, a controller that controls movements of the material spreaders and the material suppliers, and a beam irradiator that irradiates the materials with
(Continued)

a beam. The material spreaders and the material suppliers are respectively paired, and the controller controls the movements of the material spreaders and the material suppliers so that each of the material spreaders is supplied, at a predetermined timing, with the material from a paired one of the material suppliers.

9 Claims, 20 Drawing Sheets

(51) Int. Cl.

| | | |
|---|---|---|
| *B22F 3/105* | (2006.01) | |
| *B29C 64/336* | (2017.01) | |
| *B29C 64/153* | (2017.01) | |
| *B29C 64/393* | (2017.01) | |
| *B29C 64/209* | (2017.01) | |
| *B29C 64/214* | (2017.01) | |
| *B29C 64/147* | (2017.01) | |
| *B33Y 30/00* | (2015.01) | |
| *B33Y 50/00* | (2015.01) | |
| *B29C 64/40* | (2017.01) | |
| *B08B 15/02* | (2006.01) | |
| *B22F 7/06* | (2006.01) | |
| *G05B 19/00* | (2006.01) | |
| *G05B 19/05* | (2006.01) | |

(52) U.S. Cl.
CPC .......... *B29C 64/214* (2017.08); *B29C 64/336* (2017.08); *B29C 64/393* (2017.08); *B33Y 10/00* (2014.12); *B33Y 30/00* (2014.12); *B33Y 50/02* (2014.12); *B08B 15/02* (2013.01); *B22F 7/06* (2013.01); *B22F 2003/1056* (2013.01); *B22F 2003/1058* (2013.01); *B29C 64/209* (2017.08); *B29C 64/40* (2017.08); *B33Y 50/00* (2014.12); *G05B 19/00* (2013.01); *G05B 19/056* (2013.01); *Y02P 10/295* (2015.11)

(58) Field of Classification Search
USPC .......................................................... 264/497
See application file for complete search history.

(56) References Cited

U.S. PATENT DOCUMENTS

| | | | |
|---|---|---|---|
| 7,540,738 B2 | 6/2009 | Larsson et al. | |
| 8,955,558 B2* | 2/2015 | Bosveld | ................. B29C 64/20 |
| | | | 141/18 |
| 9,643,361 B2* | 5/2017 | Liu | ........................ B29C 64/20 |
| 9,662,840 B1* | 5/2017 | Buller | .................... B33Y 10/00 |
| 2002/0051853 A1 | 5/2002 | Keicher et al. | |
| 2003/0063138 A1 | 4/2003 | Varnon et al. | |
| 2010/0193998 A1 | 8/2010 | Crump et al. | |
| 2015/0290710 A1* | 10/2015 | Ackelid | ................ B22F 1/0085 |
| | | | 419/30 |
| 2015/0306666 A1 | 10/2015 | Honda | |

FOREIGN PATENT DOCUMENTS

| | | |
|---|---|---|
| JP | 2000-85019 A | 3/2000 |
| JP | 2001-47520 A | 2/2001 |
| JP | 2005-14556 A | 1/2005 |
| JP | 2005-504653 A | 2/2005 |
| JP | 2006-509914 A | 3/2006 |
| JP | 2007-118612 A | 5/2007 |
| JP | 2015-101739 A | 6/2015 |
| WO | 03/028984 A1 | 4/2003 |
| WO | 2004/054743 A1 | 7/2004 |

OTHER PUBLICATIONS

Extended European Search Report (EESR) dated May 7, 2018 for European Application No. 15 899 114.1.
Espacenet English abstract of DE 10 2005 014 483 A1.
International Search Report (ISR) dated Mar. 30, 2016 for International Application No. PCT/JP2015/086306.
J-PlatPat English abstract of JP 2001-47520 A.
J-PlatPat English abstract of JP 10-211658 A.
J-PlatPat English abstract of JP 2007-118612 A.
J-PlatPat English abstract of JP 2015/101739 A.
J-PlatPat English abstract of JP 2000-85019 A.
J-PlatPat English abstract of JP 2005-14556 A.

* cited by examiner

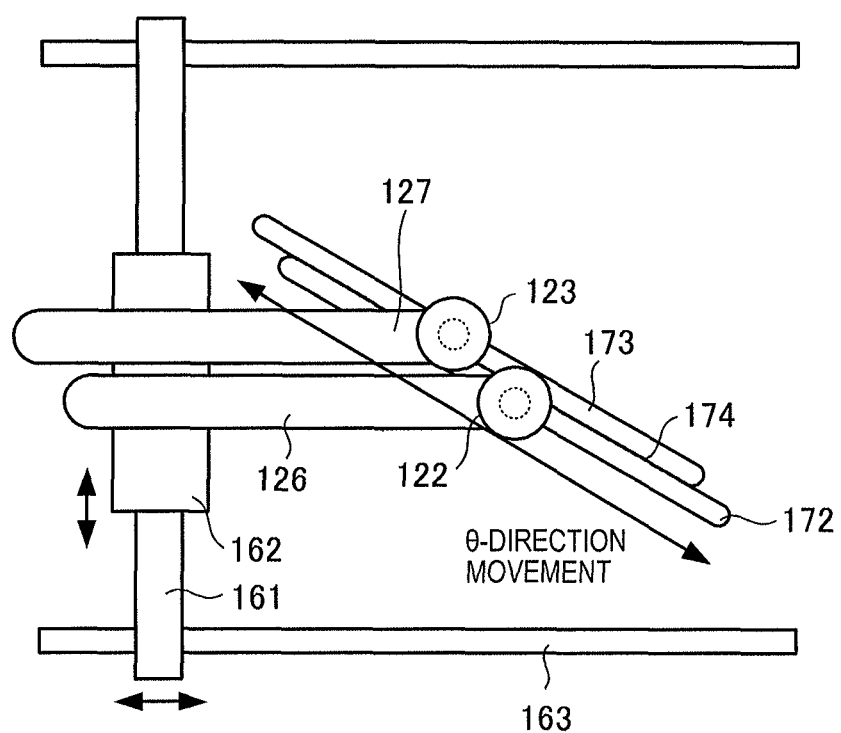
F I G. 3A

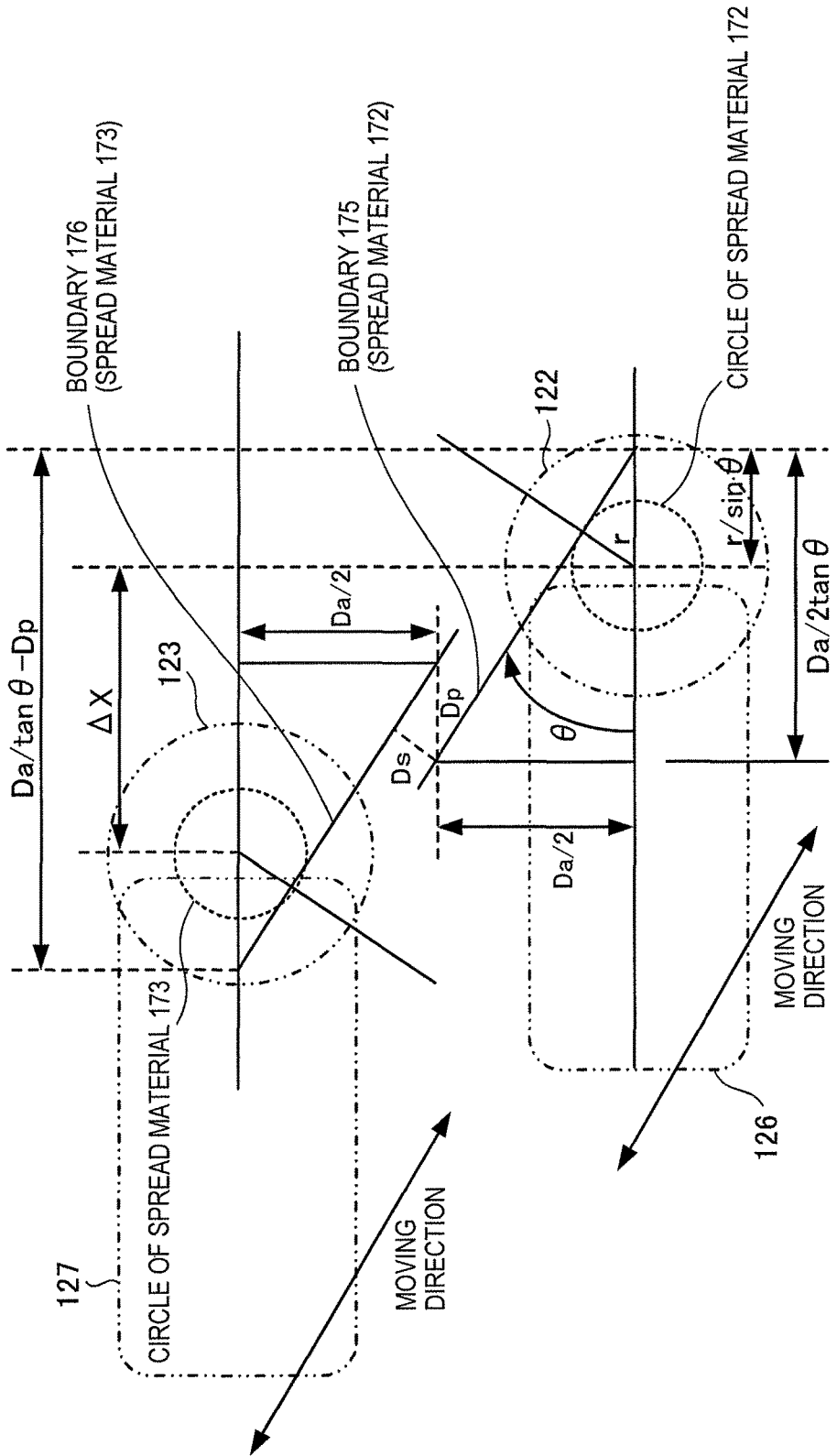

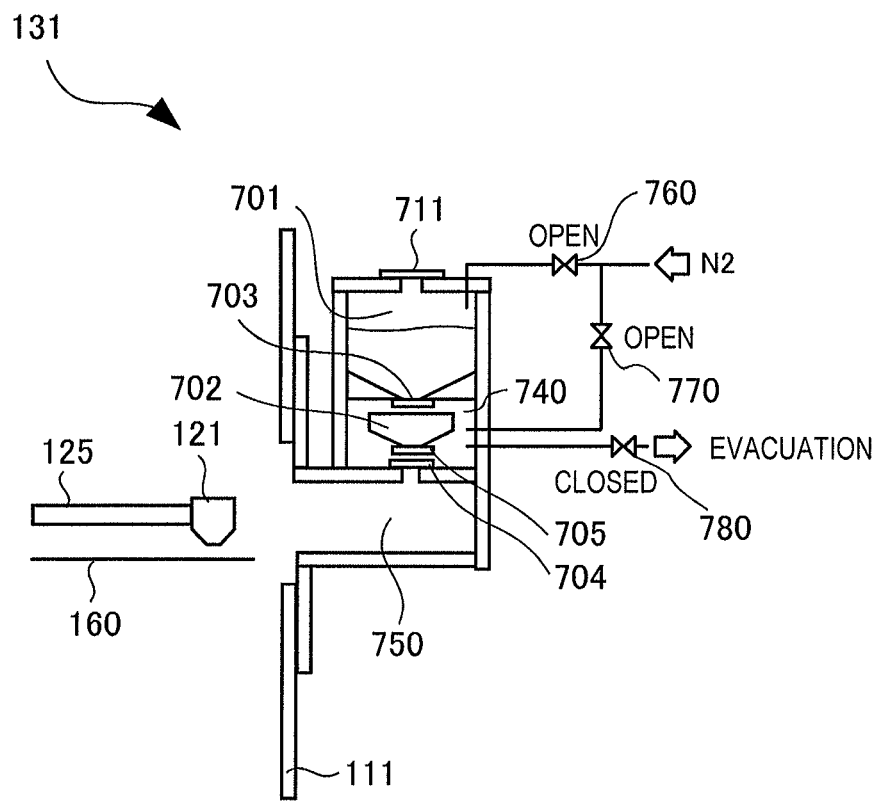
F I G. 8A

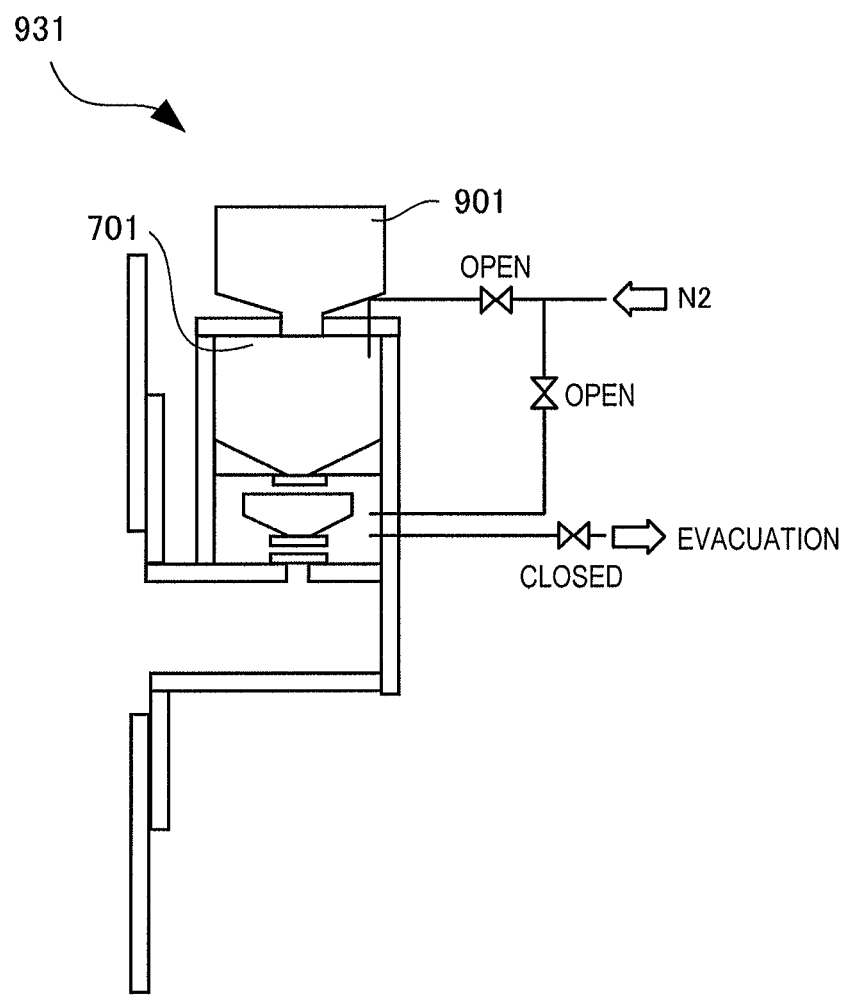
F I G. 9

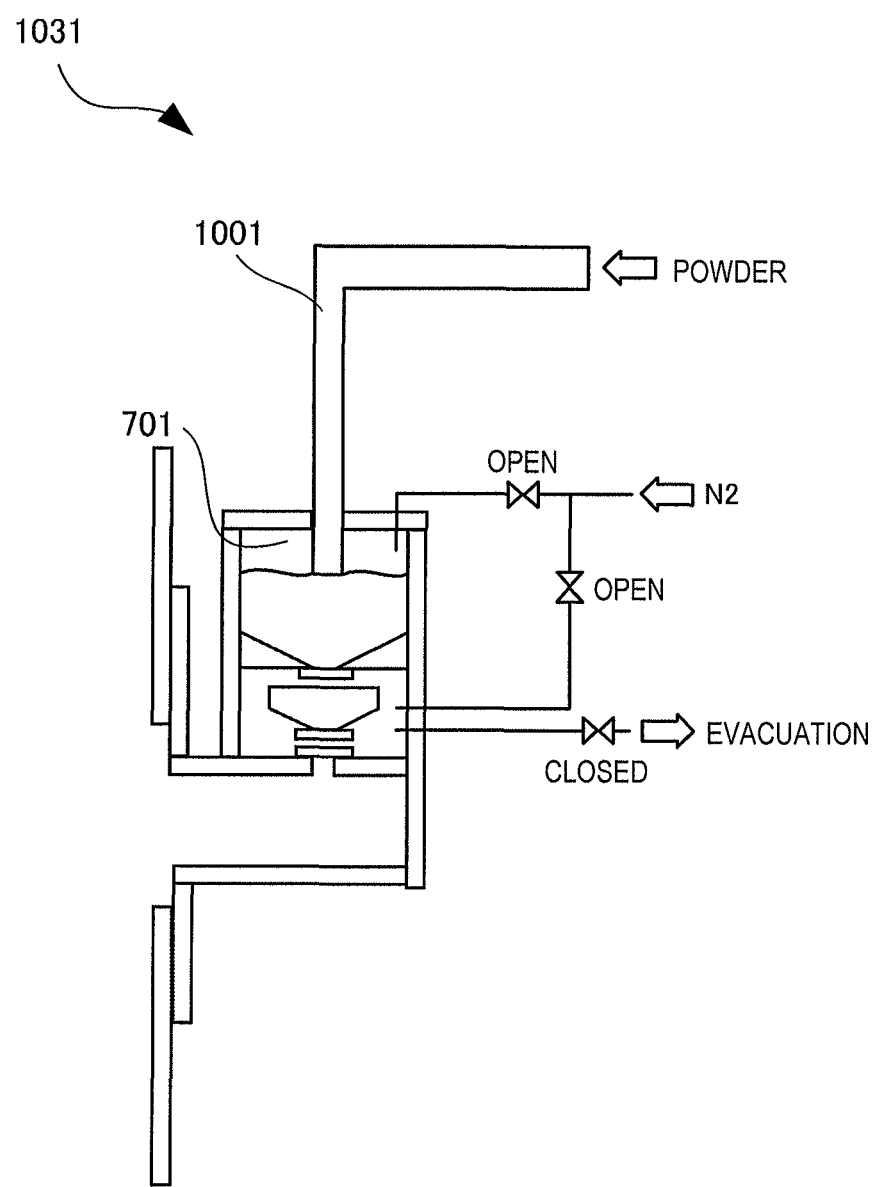
F I G. 10

THREE-DIMENSIONAL LAMINATING AND SHAPING APPARATUS, CONTROL METHOD OF THREE-DIMENSIONAL LAMINATING AND SHAPING APPARATUS, AND CONTROL PROGRAM OF THREE-DIMENSIONAL LAMINATING AND SHAPING APPARATUS

RELATED APPLICATION

This application is an application under 35 U.S.C. 371 of International Application No. PCT/JP2015/086306 filed on Dec. 25, 2015, the entire contents of which are incorporated herein by reference.

TECHNICAL FIELD

The present invention relates to a three-dimensional laminating and shaping apparatus, a control method of the three-dimensional laminating and shaping apparatus, and a control program of the three-dimensional laminating and shaping apparatus.

BACKGROUND ART

In the above technical field, patent literature 1 discloses a technique of storing, in advance, in a powder supply container provided in a shaping chamber, a necessary amount of powder for manufacturing a shaped object.

CITATION LIST

Patent Literature

Patent literature 1: Japanese PCT National Publication No. 2006-509914

SUMMARY OF THE INVENTION

Technical Problem

The technique described in the above literature, however, cannot shape a three-dimensional shaped object using a plurality of materials, and cannot implement replenishment of the materials during shaping unless an apparatus is stopped.

The present invention enables to provide a technique of solving the above-described problem.

Solution to Problem

One aspect of the present invention provides a three-dimensional laminating and shaping apparatus comprising:
a shaping chamber in which a three-dimensional laminated and shaped object is shaped;
at least two material spreaders that are provided in the shaping chamber and spread materials of the three-dimensional laminated and shaped object;
at least two material suppliers that supply the materials to the material spreaders;
a controller that controls movements of the material spreaders and the material suppliers; and
a beam irradiator that irradiates the materials with a beam, wherein the material spreaders and the material suppliers are respectively paired, and
the controller controls the movements of the material spreaders and the material suppliers so that each of the material spreaders is supplied, at a predetermined timing, with the material from a paired one of the material suppliers.

Another aspect of the present invention provides a control method of a three-dimensional laminating and shaping apparatus including
a shaping chamber in which a three-dimensional laminated and shaped object is shaped,
at least two material spreaders that are provided in the shaping chamber and spread materials of the three-dimensional laminated and shaped object,
at least two material suppliers that supply the materials to the material spreaders,
a controller that controls movements of the material spreaders, and
a beam irradiator that irradiates the materials with a beam, wherein the material spreaders and the material suppliers are respectively paired,
the method comprising:
controlling the movements of the material spreaders so that each of the material spreaders is supplied, at a predetermined timing, with the material from a paired one of the material suppliers.

Still other aspect of the present invention provides a control program of a three-dimensional laminating and shaping apparatus including
a shaping chamber in which a three-dimensional laminated and shaped object is shaped,
at least two material spreaders that are provided in the shaping chamber and spread materials of the three-dimensional laminated and shaped object,
at least two material suppliers that supply the materials to the material spreaders,
a controller that controls movements of the material spreaders, and
a beam irradiator that irradiates the materials with a beam, wherein the material spreaders and the material suppliers are respectively paired,
the program for causing a computer to execute a method, comprising:
controlling the movements of the material spreaders so that each of the material spreaders is supplied, at a predetermined timing, with the material from a paired one of the material suppliers.

Advantageous Effects of Invention

According to the present invention, it is possible to shape a three-dimensional shaped object using a plurality of materials, and also implement replenishment of the materials during shaping without stopping an apparatus.

BRIEF DESCRIPTION OF DRAWINGS

FIG. 3A is a plan view for explaining the arrangement of the cartridges of the three-dimensional laminating and shaping apparatus and a state of the spread of the materials by the cartridges according to the first embodiment of the present invention;

FIG. 3B is a view for explaining material spread regions by the cartridges of the three-dimensional laminating and shaping apparatus according to the first embodiment of the present invention;

FIG. 8A is a view for explaining a state of material supply by each material supplier of the three-dimensional laminating and shaping apparatus according to the first embodiment of the present invention;

FIG. 9 is a view for explaining the arrangement of a material supplier of a three-dimensional laminating and shaping apparatus according to the second embodiment of the present invention;

FIG. 10 is a view for explaining the arrangement of a material supplier of a three-dimensional laminating and shaping apparatus according to the third embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
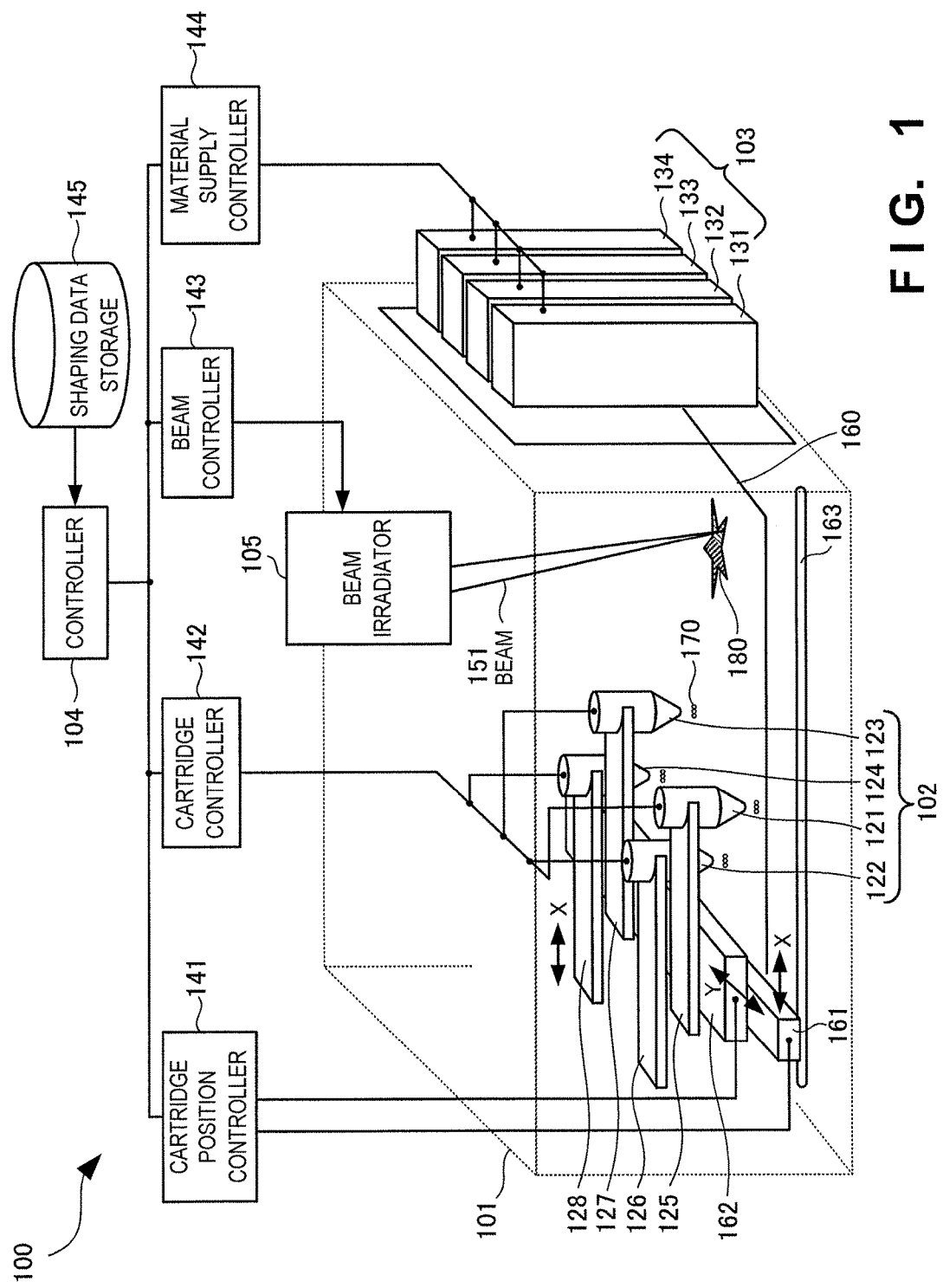
FIG. 1 is a view showing the arrangement of a three-dimensional laminating and shaping apparatus according to the first embodiment of the present invention.

A three-dimensional laminating and shaping apparatus 100 according to the first embodiment of the present invention will be described with reference to FIG. 1. FIG. 1 is a view for explaining the arrangement of the three-dimensional laminating and shaping apparatus 100 according to this embodiment. Note that in FIG. 1, to avoid the view from becoming complicated, components other than those shown in FIG. 1 are not illustrated, as needed. The three-dimensional laminating and shaping apparatus 100 is an apparatus for shaping a three-dimensional laminated and shaped object 180 by spreading a material 170 of the three-dimensional laminated and shaped object 180 on a shaping surface 160, melting and solidifying the material 170 by irradiating the spread material 170 with an electron beam 151 or the like, and laminating the material 170.

As shown in FIG. 1, the three-dimensional laminating and shaping apparatus 100 includes a chamber 101, cartridges 102, material suppliers 103, a laminating and shaping controller 104, and a beam irradiator 105. The chamber 101 is a shaping chamber in which the three-dimensional laminated and shaped object 180 is shaped. Various equipments necessary for shaping the three-dimensional laminated and shaped object 180 are provided in the chamber 101.

Each cartridge 102 serves as a material spreader that spreads the material 170 of the three-dimensional laminated and shaped object 180 on the shaping surface 160. In this embodiment, four cartridges 102 are provided. That is, there are provided four cartridges 102 including a cartridge (first cartridge) 121, a cartridge (second cartridge) 122, a cartridge (third cartridge) 123, and a cartridge (fourth cartridge) 124.

Each cartridge 102 is fixed to a cartridge holder as an arm for holding the cartridge 102. That is, the cartridge 121 is attached to a cartridge holder 125 (first cartridge holder). Similarly, the cartridge 122 is attached to a cartridge holder 126 (second cartridge holder). Furthermore, the cartridge 123 is attached to a cartridge holder 127 (third cartridge holder), and the cartridge 124 is attached to a cartridge holder 128 (fourth cartridge holder).

The cartridge holders 125, 126, 127, and 128 are attached to a Y-direction stage 162.

The Y-direction stage 162 is attached onto an X-direction stage 161, and moves in the Y direction on the X-direction stage 161. The X-direction stage 161 is attached to an X-direction rail 163, and moves in the X direction along the X-direction rail 163.

For example, the cartridge 121 can move to an arbitrary position on the shaping surface 160 when the X-direction stage 161 and the Y-direction stage 162 move independently of each other. Furthermore, the cartridge holder 125 can move in the X direction independently of the movement of the X-direction stage 161. For example, the cartridge 121 can largely move in the X direction using the X-direction stage 161, and can be finely moved by moving the cartridge holder 125. That is, to largely move the cartridge 121, the cartridge 121 is moved using the X-direction stage 161. To finely move the cartridge 121, the cartridge 121 is moved using the cartridge holder 125. This can freely control the movement of the one cartridge 121. The same applies to the remaining cartridges 122, 123, and 124.

The cartridges 102 may be filled with the same type of material 170 or different types of materials 170. Alternatively, some cartridges 102 may be filled with the same type of material 170, and the remaining cartridges 102 may be filled with the different types of materials 170, respectively. The materials 170 with which the cartridges 102 are filled can be freely selected in accordance with the property and characteristic of the three-dimensional laminated and shaped object 180 to be shaped.

The material suppliers 103 are provided on the side wall of the chamber 101. In this embodiment, the four material suppliers 103 in total are provided. Each material supplier 103 supplies the material 170 to the cartridge 102 to be paired. That is, a material supplier 131 (first material supplier) is paired with the cartridge 121, and supplies the material 170 to the cartridge 121. Similarly, a material supplier 132 (second material supplier) is paired with the cartridge 122, and supplies the material 170 to the cartridge 122. A material supplier 133 (third material supplier) is paired with the cartridge 123, and supplies the material 170 to the cartridge 123. Furthermore, a material supplier 134 (fourth material supplier) is paired with the cartridge 124, and supplies the material 170 to the cartridge 124.

The controller 104 controls the operation of the overall three-dimensional laminating and shaping apparatus 100 and the like. The controller 104 is connected to a cartridge position controller 141, a cartridge controller 142, a beam controller 143, and a material supply controller 144. The controller 104 is also connected to a shaping data storage 145. The controller 104 transmits a control signal to each of the cartridge position controller 141, cartridge controller 142, beam controller 143, and material supply controller 144.

For example, the controller 104 receives shaping data of the three-dimensional laminated and shaped object 180 from the shaping data storage 145, generates a shaping schedule based on the received shaping data, and transmits a control signal to each of the controllers 141, 142, 143, and 144. Upon receiving the control signal transmitted from the controller 104, each of the controllers 141, 142, 143, and 144 executes control based on the received control signal.

The cartridge position controller 141 controls the X-direction stage 161, the Y-direction stage 162, and the cartridge holder 125, 126, 127, and 128 to move each cartridge 102 to a predetermined position on the shaping surface 160. When each cartridge 102 moves to the predetermined position on the shaping surface 160, the cartridge controller 142 spreads the material 170 to be spread by an amount to be spread at the predetermined position. Upon completion of the spread of the material 170 by each cartridge 102, the beam controller 143 controls the beam irradiator 105 to irradiate the material 170 with the beam 151. When all the material 170 stored in each cartridge 102 is spread and the cartridge 102 becomes empty, the material supply controller 144 replenishes the cartridge 102 with the material 170 by supplying a necessary amount of the material 170 to the cartridge 102. In addition, when the remaining amount of the material 170 stored in each cartridge 102 becomes equal to or smaller than a predetermined amount, the material supply controller 144 may replenish the cartridge 102 with the material 170 by supplying a necessary amount of the material 170 to the cartridge 102. Each cartridge 102 may be replenished with a replenishment amount of the material 170 corresponding to the allowable storage amount of the cartridge 102, or a predetermined amount of the material 170.

Note that the material 170 is represented by a metal powder or the like. However, the material 170 is not limited to this, and a resin, a liquid, or the like may be used. This embodiment has explained the example in which the number of cartridges 102 is four. The number of cartridges 102 may be two, three, or five or more. In this case, the number of material suppliers 103 may be two, three, or five or more in correspondence with the number of cartridges 102. The beam 151 emitted by the beam irradiator 105 is an electron beam, laser beam, or ion beam, but is not limited to them. Furthermore, the beam 151 may be a continuous beam or pulse beam.

Figure 2A:
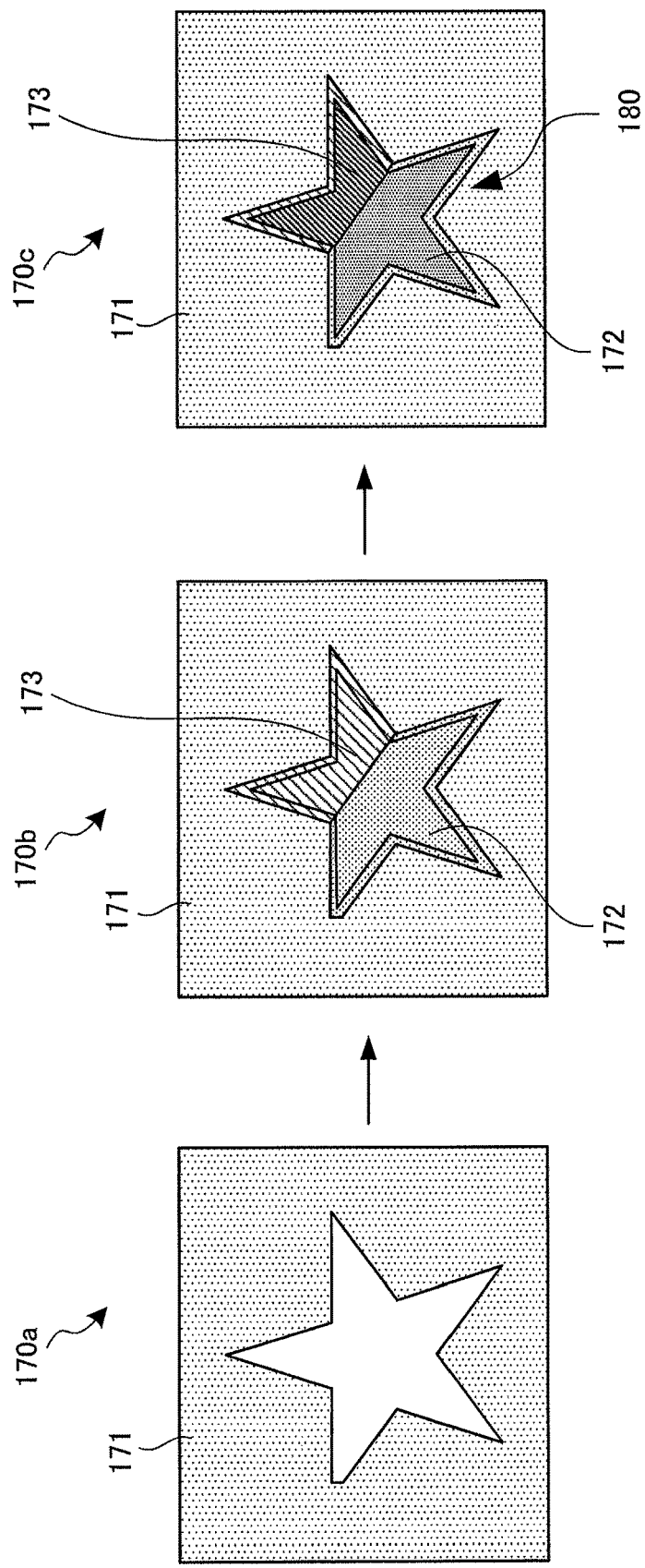
FIG. 2A is a view for explaining a process of spreading different types of materials by the three-dimensional laminating and shaping apparatus according to the first embodiment of the present invention.

FIG. 2A is a view for explaining a process of spreading different materials by the three-dimensional laminating and shaping apparatus 100 according to this embodiment. This example assumes that the three-dimensional laminating and shaping apparatus 100 shapes the three-dimensional laminated and shaped object 180 of a star shape. As shown in 170a, the three-dimensional laminating and shaping apparatus 100 spreads a material (first material) 171 on the shaping surface 160. The material 171 is spread on a region outside the star shape. In this state, therefore, the material 171 is spread over the shaping surface 160 except for a region inside the star shape. The material 171 is spread on the region which is not irradiated with the beam 151, and serves as a support material of the three-dimensional laminated and shaped object 180 to be finally shaped. Since the material 171 is finally removed, a material of a relatively low cost is used as the material 171. For example, artificial quartz, iron, or the like is used but the present invention is not limited to it. Furthermore, the material 171 may be spread using the cartridge 102 including a nozzle portion of a relatively large diameter, for example, the cartridge 121.

As shown in 170b, the three-dimensional laminating and shaping apparatus 100 spreads materials 172 and 173. The material 172 is spread on a lower left region of the star shape and the material 173 is spread on an upper right region of the star shape. The materials 172 and 173 are spread on the regions having a boundary, except for the region on which the material 171 has been spread. That is, the materials 172 and 173 are spread on a shaping region in which the three-dimensional laminated and shaped object 180 is shaped. The materials 172 and 173 may be accurately spread using the cartridges 102 each including a nozzle portion of a relatively small diameter, for example, the cartridges 122 and 123. The three-dimensional laminating and shaping apparatus 100 melts and solidifies the materials 172 and 173 by irradiating them with the beam 151, thereby completing laminating of one layer. Upon completion of laminating of one layer, the shaping surface 160 is moved down by one layer, and the materials 171, 172, and 173 are repeatedly spread, as shown in 170a and 170b.

After all laminating processes are completed by repeating the above process, the material 171 is all removed to complete the three-dimensional laminated and shaped object 180, as shown in 170c.

Figure 2B:
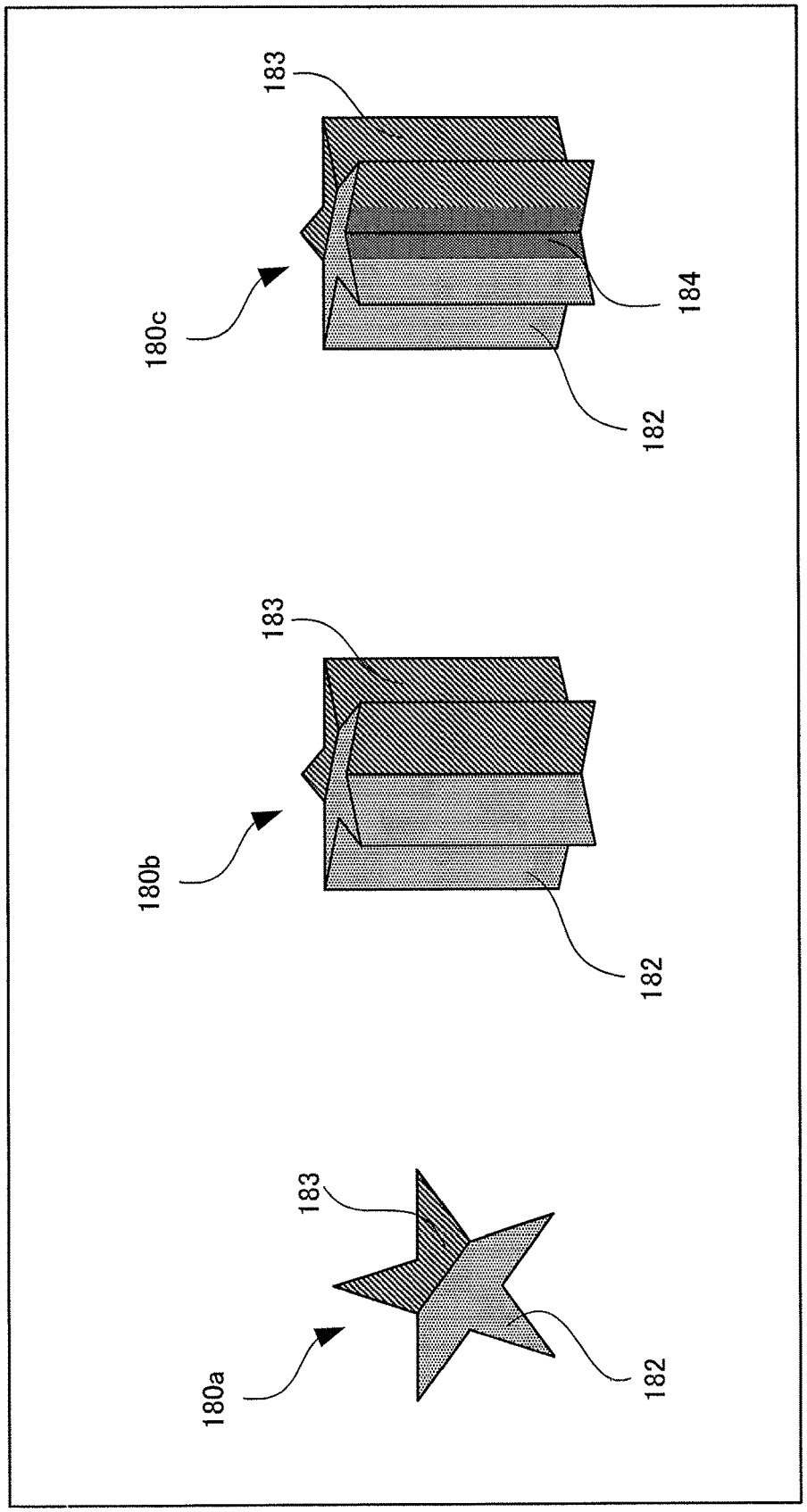
FIG. 2B is a view for explaining the arrangement of a three-dimensional shaped object shaped by the three-dimensional laminating and shaping apparatus according to the first embodiment of the present invention.

FIG. 2B is a view for explaining the arrangement of the three-dimensional laminated and shaped object 180 shaped by the three-dimensional laminating and shaping apparatus 100 according to this embodiment. In 180a shows a plan view, and 180b and 180c respectively show perspective views. As shown in 180a and 180b, the three-dimensional laminated and shaped object 180 is formed by including a shaped object 182 made of the material 172 and a shaped object 183 made of the material 173. As shown in 180c, a boundary 184 between the shaped objects 182 and 183 can have an inclined structure by appropriately changing the concentrations of the materials 172 and 173 near the boundary 184.

Figure 4:
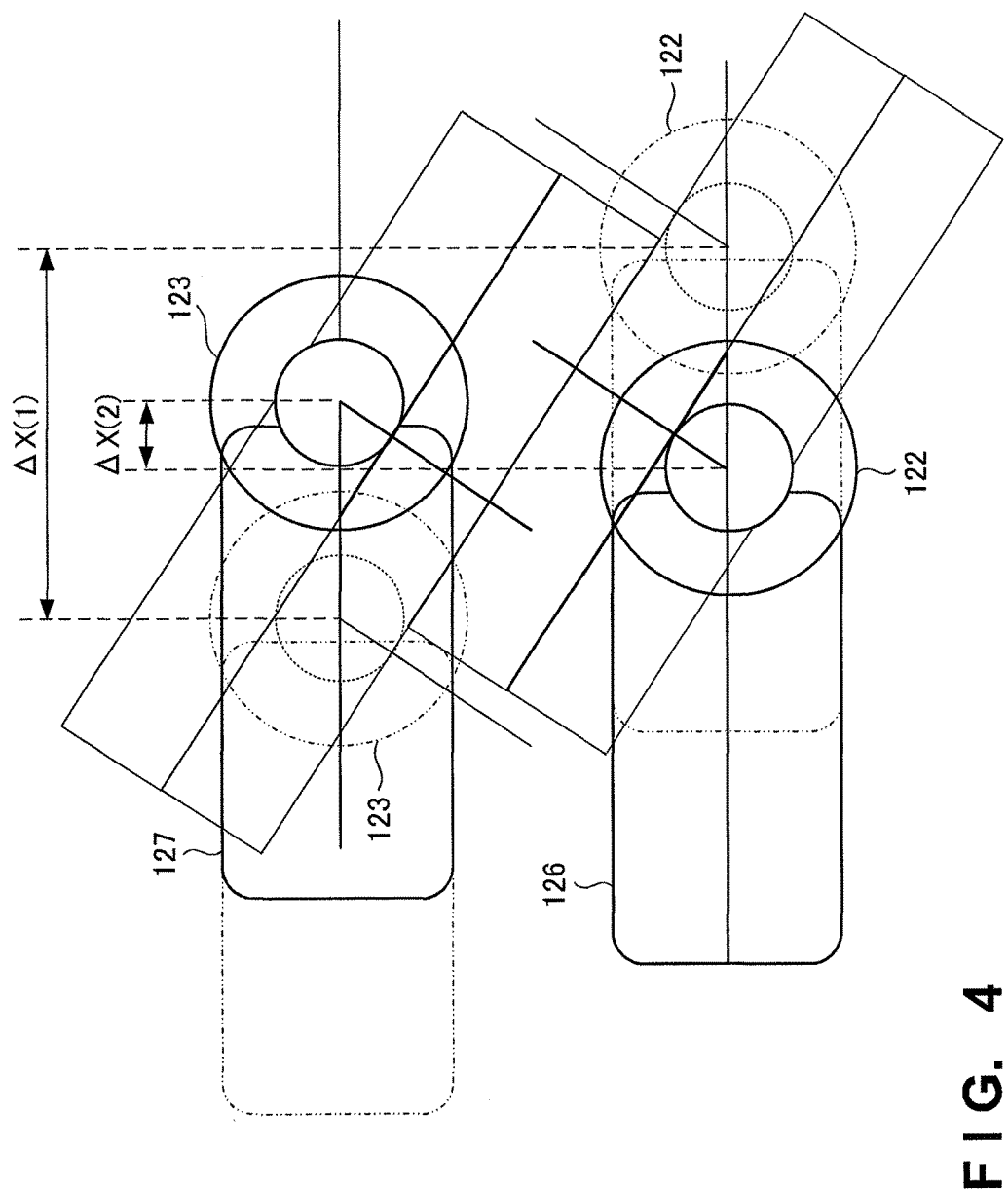
FIG. 4 is a view for explaining material spread regions by the cartridges of the three-dimensional laminating and shaping apparatus according to the first embodiment of the present invention.

FIG. 3A is a plan view for explaining the arrangement of the cartridges of the three-dimensional laminating and shaping apparatus and a state of the spread of the materials by the cartridges according to this embodiment. FIG. 3B is a view for explaining the material spread regions by the cartridges of the three-dimensional laminating and shaping apparatus according to this embodiment. FIG. 4 is a view for explaining the material spread regions by the cartridges of the three-dimensional laminating and shaping apparatus according to this embodiment.

Consider, for example, a case in which the two different materials 172 and 173 are spread and contact each other at a boundary 174 at an arbitrary angle (θ). If the relative positions of the cartridges 122 and 123 are fixed, and the cartridges 122 and 123 are moved in the θ direction, the boundary 174 between the spread materials 172 and 173 is formed.

The cartridges 122 and 123 are moved in the θ direction by simultaneously moving the X-direction stage 161 and the Y-direction stage 162 at speeds cos θ and sin θ, respectively.

As shown in FIG. 3B, the cartridges 122 and 123 respectively spread the materials in circular shapes, each having a radius r, of the spread materials 172 and 173. In this state, if the cartridges 122 and 123 are moved in the θ direction, lines (or bands), each having a width 2r, of the spread materials 172 and 173 are formed. When a boundary 175 (the spread material 172) and a boundary 176 (the spread material 173), which are formed by spreading the materials 172 and 173 from the cartridges 122 and 123, respectively, coincide with each other, the boundary 174 between the two different materials 172 and 173 shown in FIG. 3A is formed.

When ΔX and Da respectively represent the distances in the X and Y directions between the centers of the cartridges 122 and 123, θ represents an angle from the X direction, and Ds represents the distance between the boundaries 175 and 176, ΔX is expressed by a function of Ds and θ, and given by:

$$\Delta X = F(Ds, \theta) = (Da/\tan \theta) - ((Ds+2r)/\sin \theta) \quad (1)$$

Therefore, if the materials 172 and 173 are spread from the cartridges 122 and 123 by setting Ds=0, the boundary 174 is created while the boundaries 175 and 176 are in contact with each other. If, similarly, the cartridges 122 and 123 are moved in the θ direction and the materials 172 and 173 are spread by setting Ds=4r, the line (band) of the spread material 172 and the line (band) of the spread material 173 can be spread, as shown in FIG. 4. By generalizing this procedure and setting Ds=4(n−1)r for n=1, 2, 3, . . . , ΔX=ΔX(n) can be obtained where n represents the number of times the cartridges 122 and 123 are moved (the cartridges 122 and 123 execute scans). The procedure is continued until the spread ends.

Figure 5:
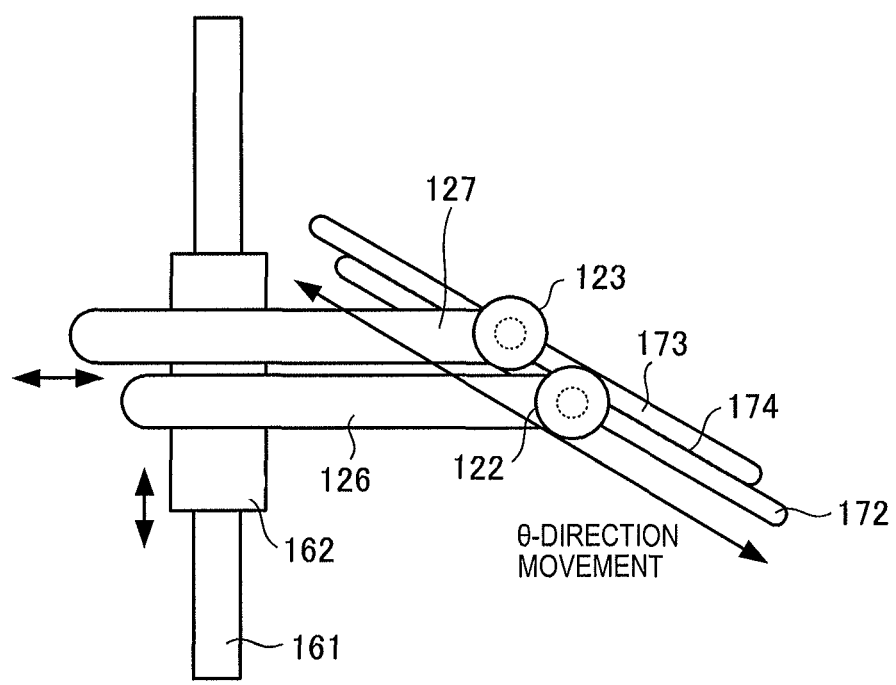
FIG. 5 is a plan view for explaining another arrangement of the cartridges of the three-dimensional laminating and shaping apparatus according to the first embodiment of the present invention.

FIG. 5 is a plan view for explaining another arrangement of the cartridges of the three-dimensional laminating and shaping apparatus 100 according to this embodiment. If the cartridge holders 126 and 127 have enough lengths in the X direction to cover the width in the X direction of the shaping surface 160, the X-direction rail 163 becomes unnecessary, as shown in FIG. 5. That is, if the arms of the cartridge holders 126 and 127 have enough lengths, even if the X-direction stage 161 is fixed, it is possible to perform the same operation without moving the X-direction stage 161 along the X-direction rail 163. In this case, the cartridges 122 and 123 are moved in the X direction using the cartridge holders 126 and 127. That is, the cartridges 122 and 123 are moved in the X direction by adjusting the lengths of the arms of the cartridge holders 126 and 127, that is, by extending/retracting the arms. Note that the case in which the boundary between the spread materials is linear has been explained above. However, it is also possible to form a boundary by a curve of an arbitrary shape by changing the angle θ and moving the cartridges 102.

Figure 6A:
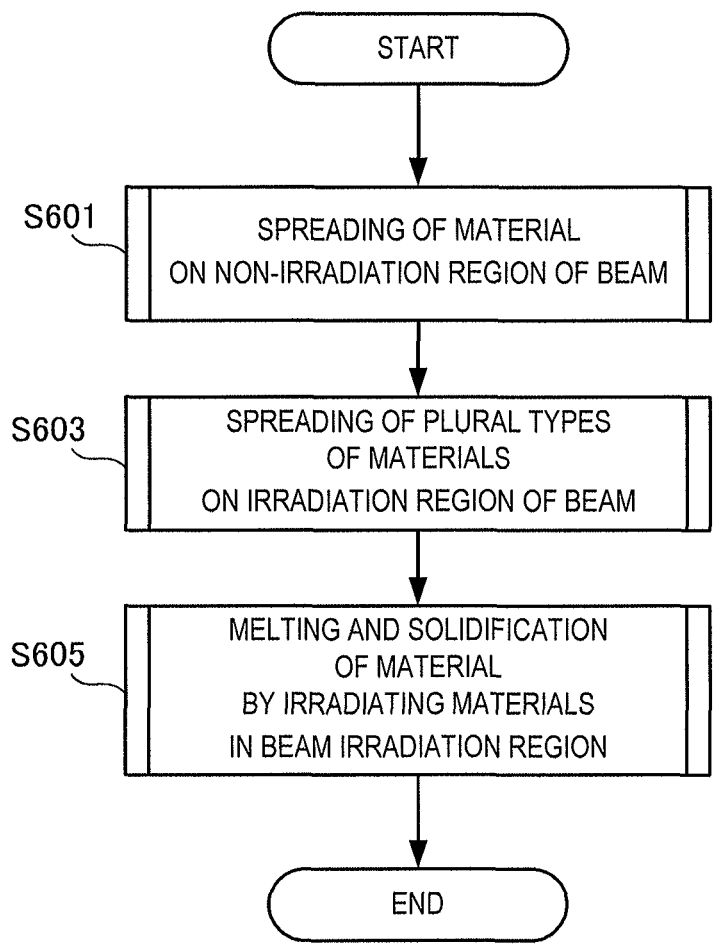
FIG. 6A is a flowchart for explaining the material spreading procedure of the three-dimensional laminating and shaping apparatus according to the first embodiment of the present invention.

FIG. 6A is a flowchart for explaining the material spreading procedure of the three-dimensional laminating and shaping apparatus 100 according to this embodiment. In step S601, the three-dimensional laminating and shaping apparatus 100 spreads the material 171 on a non-irradiation region of the beam 151 on the shaping surface 160. That is, the three-dimensional laminating and shaping apparatus 100 spreads the material 171 serving as a support material on a predetermined region. In step S603, the three-dimensional laminating and shaping apparatus 100 spreads the plural types of materials 172 and 173 on an irradiation region of the beam 151 on the shaping surface 160. That is, the three-dimensional laminating and shaping apparatus 100 spreads the materials 172 and 173 of the three-dimensional laminated and shaped object 180 on a predetermined region. In step S605, the three-dimensional laminating and shaping apparatus 100 melts and solidifies the materials 172 and 173 by irradiating them in the irradiation region of the beam 151 with the beam 151, thereby shaping the three-dimensional laminated and shaped object 180.

Figure 6B:
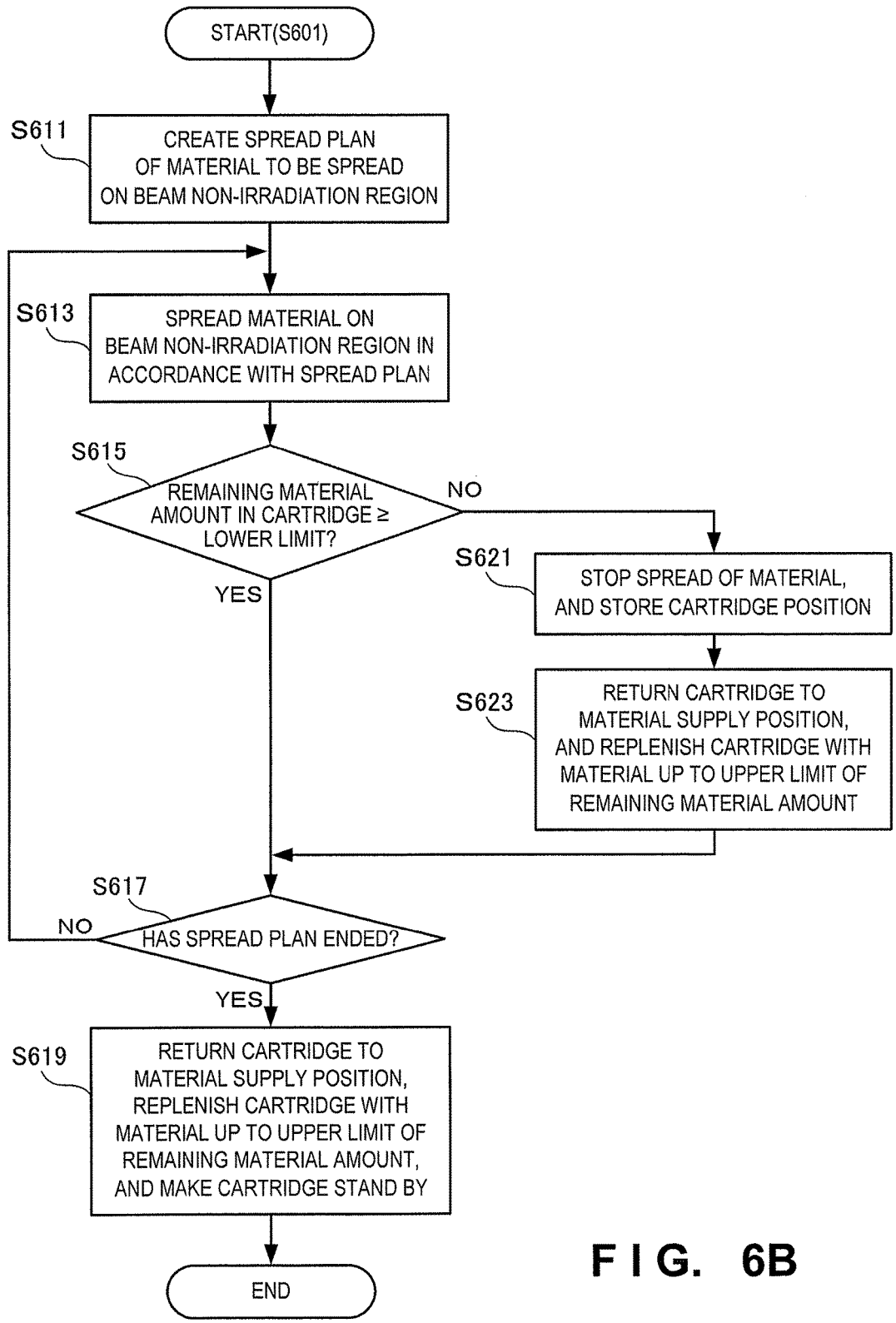
FIG. 6B is a flowchart for explaining the material spreading procedure of the three-dimensional laminating and shaping apparatus according to the first embodiment of the present invention.

FIG. 6B is a flowchart for explaining the material spreading procedure (step S601) of the three-dimensional laminating and shaping apparatus according to this embodiment. In step S611, the three-dimensional laminating and shaping apparatus 100 creates a spread plan of the material 171 to be spread on the region which is not irradiated with the beam 151. The laminating and shaping controller 104 acquires the shaping data of the three-dimensional laminated and shaped object 180 from the shaping data storage 145, and creates, based on the acquired shaping data, the spread plan of the material 171 to be spread on the region (beam non-irradiation region) which is not irradiated with the beam 151. The spread plan includes, for example, a spread timing of the material 171 by the cartridge 121 and a replenishment timing of the material 171 from the material supplier 131.

In step S613, in accordance with the created spread plan, the three-dimensional laminating and shaping apparatus 100 spreads the material 171 on the region which is not irradiated with the beam 151. In this case, for example, the laminating and shaping controller 104 transmits a control signal according to the created spread plan to each of the cartridge position controller 141, the cartridge controller 142, the material supply controller 144, and the like. Upon receiving the control signal, each of the cartridge position controller 141, the cartridge controller 142, the material supply controller 144, and the like controls the movement of each cartridge 102 and the like so as to perform an operation according to the spread plan. That is, the material 171 is spread by causing the cartridge 121 storing the material 171 to execute a scan on the shaping surface 160.

If the cartridge 121 passes through the irradiation region of the beam 151 during the spread of the material 171, it stops the spread of the material 171. If the spread is interrupted for replenishment of the material 171 after all the material 171 stored in the cartridge 121 is spread or a predetermined amount of the material 171 is spread, the spread of the material 171 is restarted from the interrupt position at which the spread has been interrupted.

In step S615, the cartridge controller 142 of the three-dimensional laminating and shaping apparatus 100 determines whether the remaining material amount in the cartridge 121 is equal to or larger than a lower limit. If the remaining material amount is equal to or larger than the lower limit, the three-dimensional laminating and shaping apparatus 100 continues spreading the material 171. If the remaining material amount is not equal to or larger than the lower limit, that is, the remaining material amount is smaller than the lower limit, the three-dimensional laminating and shaping apparatus 100 advances to step S621.

In step S621, the three-dimensional laminating and shaping apparatus 100 stops (interrupts) the spread of the material 171, and stores the position of the cartridge 121 on the shaping surface 160. In step S623, the three-dimensional laminating and shaping apparatus 100 moves the cartridge 121 to a material supply position, that is, a position below the material supplier 131. The laminating and shaping controller 104 of the three-dimensional laminating and shaping apparatus 100 controls the material supply controller 144 to supply the material 171 from the material supplier 131 to the cartridge 121, thereby replenishing the cartridge 121 with the material 171. The replenishment amount of the material 171 may be an amount up to the upper limit of the remaining material amount of the cartridge 121 or a necessary amount for the rest of the spread of the material.

In step S617, the three-dimensional laminating and shaping apparatus 100 determines whether the created spread plan has ended. If it is determined that the spread plan has not ended, the three-dimensional laminating and shaping apparatus 100 repeats the processes in step S613 and subsequent steps; otherwise, the three-dimensional laminating and shaping apparatus 100 returns the cartridge 121 to the material supply position as the position below the material supplier 131, replenishes the cartridge 121 with the material 171 up to the upper limit of the remaining material amount, and makes the cartridge 121 stand by until next shaping starts.

Figure 6C:
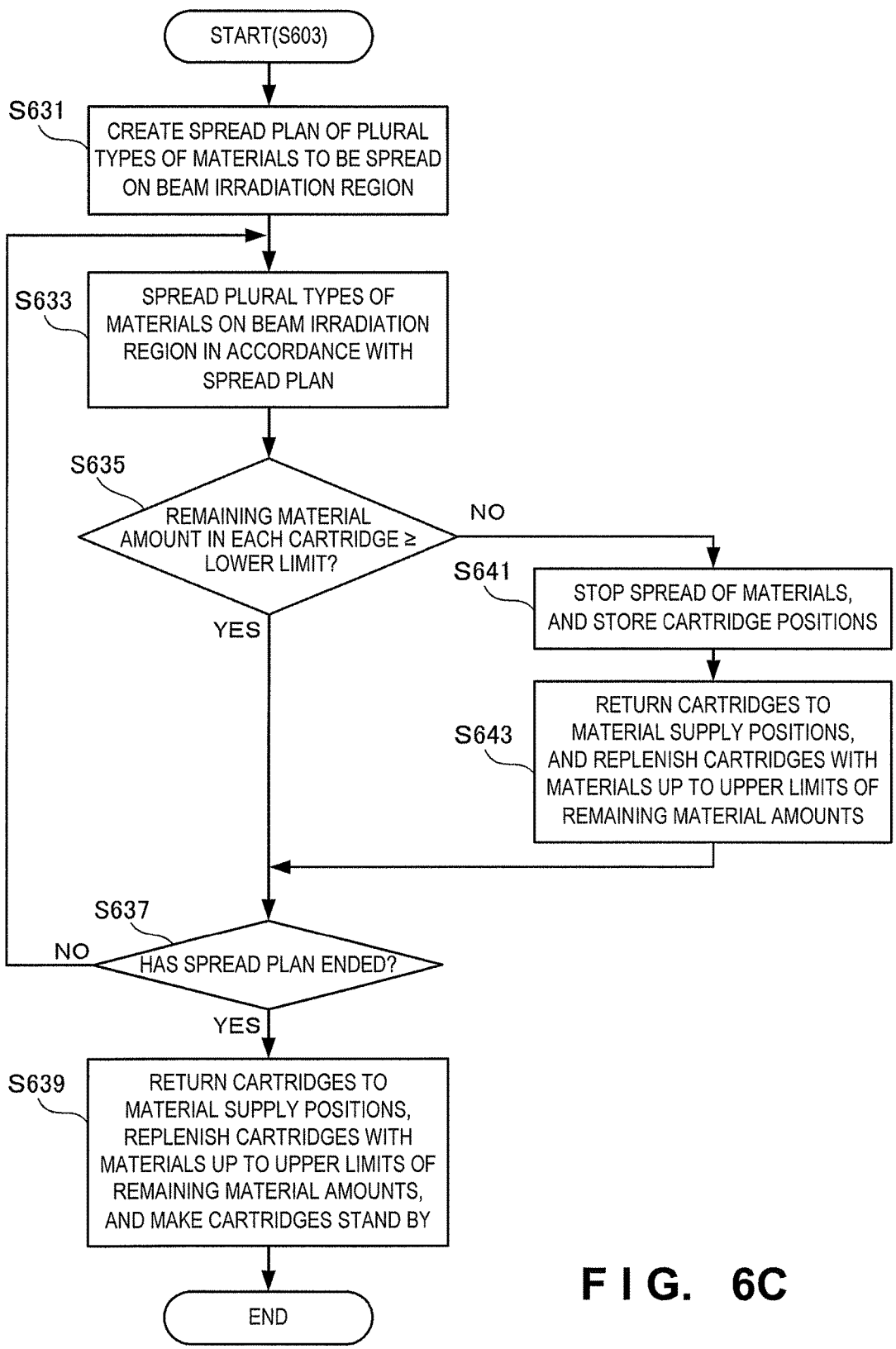
FIG. 6C is a flowchart for explaining the material spreading procedure of the three-dimensional laminating and shaping apparatus according to the first embodiment of the present invention.

FIG. 6C is a flowchart for explaining the material spreading procedure (step S603) of the three-dimensional laminating and shaping apparatus according to this embodiment. In step S631, the three-dimensional laminating and shaping apparatus 100 creates a spread plan of the materials 172 and 173 to be spread on the region which is irradiated with the beam 151. The laminating and shaping controller 104 acquires the shaping data of the three-dimensional laminated and shaped object 180 from the shaping data storage 145, and creates, based on the acquired shaping data, the spread plan of the materials 172 and 173 to be spread on the region (beam irradiation region) which is irradiated with the beam 151. The spread plan includes, for example, the spread timings of the materials 172 and 173 by the cartridges 122 and 123, and the replenishment timings of the materials 172 and 173 from the material suppliers 132 and 133.

In step S633, in accordance with the created spread plan, the three-dimensional laminating and shaping apparatus 100 spreads the materials 172 and 173 on the region which is irradiated with the beam 151. In this case, for example, the laminating and shaping controller 104 transmits a control signal according to the created spread plan to each of the cartridge position controller 141, the cartridge controller 142, the material supply controller 144, and the like. Upon receiving the control signal, each of the cartridge position controller 141, the cartridge controller 142, the material supply controller 144, and the like controls the movements of the cartridges 122 and 123 and the like so as to perform an operation according to the spread plan. That is, the materials 172 and 173 are spread by causing each of the cartridges 122 and 123 storing the materials 172 and 173 to execute a scan on the shaping surface 160.

If the cartridges 122 and 123 pass through the non-irradiation region of the beam 151 during the spread of the materials 172 and 173, respectively, they stop the spread of the materials 172 and 173. If the spread is interrupted for replenishment of the materials 172 and 173 after all the materials 172 and 173 stored in the cartridges 122 and 123 are spread or a predetermined amount of the material 172, 173 is spread, the spread of the materials 172 and 173 is restarted from the interrupt positions at which the spread has been interrupted.

In step S635, the cartridge controller 142 of the three-dimensional laminating and shaping apparatus 100 determines whether the remaining material amount in each of the cartridges 122 and 123 is equal to or larger than the lower limit. If the remaining material amount is equal to or larger than the lower limit, the three-dimensional laminating and shaping apparatus 100 continues spreading the materials 172 and 173. If the remaining material amount is not equal to or larger than the lower limit, that is, the remaining material amount is smaller than the lower limit, the three-dimensional laminating and shaping apparatus 100 advances to step S641.

In step S641, the three-dimensional laminating and shaping apparatus 100 stops (interrupts) the spread of the materials 172 and 173, and stores the positions of the cartridges 122 and 123 on the shaping surface 160. In step S643, the three-dimensional laminating and shaping apparatus 100 respectively moves the cartridges 122 and 123 to material supply positions, that is, positions below the material suppliers 132 and 133. The laminating and shaping controller 104 of the three-dimensional laminating and shaping apparatus 100 controls the material supply controller 144 to supply the materials 172 and 173 from the material suppliers 132 and 133 to the cartridges 122 and 123, thereby replenishing the cartridges 122 and 123 with the materials 172 and 173, respectively. The replenishment amounts of the materials 172 and 173 may be amounts up to the upper limits of the remaining material amounts of the cartridges 122 and 123 or necessary amounts for the rest of the spread of the materials.

In step S637, the three-dimensional laminating and shaping apparatus 100 determines whether the created spread plan has ended. If it is determined that the spread plan has not ended, the three-dimensional laminating and shaping apparatus 100 repeats the processes in step S633 and subsequent steps; otherwise, the three-dimensional laminating and shaping apparatus 100 returns the cartridges 122 and 123 to the material supply positions as the positions below the material suppliers 132 and 133. The three-dimensional laminating and shaping apparatus 100 replenishes the cartridges 122 and 123 with the materials 172 and 173 up to the upper limits of the remaining material amounts, respectively, and makes the cartridges 122 and 123 stand by until next shaping starts.

Figure 6D:
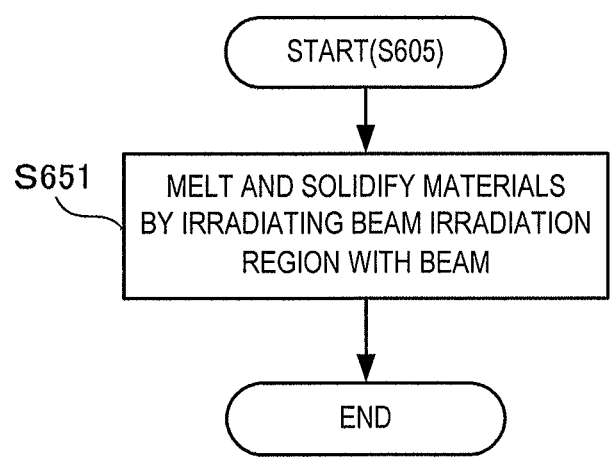
FIG. 6D is a flowchart for explaining the material spreading procedure of the three-dimensional laminating and shaping apparatus according to the first embodiment of the present invention.

FIG. 6D is a flowchart for explaining the material spreading procedure (step S605) of the three-dimensional laminating and shaping apparatus according to this embodiment. In step S651, the three-dimensional laminating and shaping apparatus 100 melts and solidifies the materials 172 and 173 by irradiating them in the beam irradiation region with the beam 151, thereby shaping the three-dimensional laminated and shaped object 180.

Figure 7A:
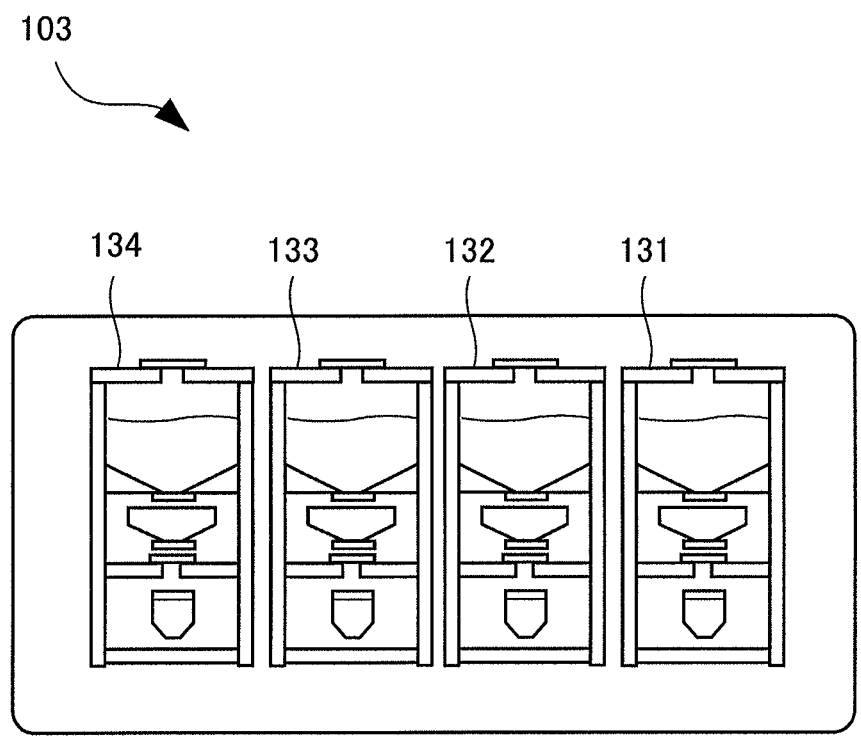
FIG. 7A is a view for explaining the arrangement of material suppliers of the three-dimensional laminating and shaping apparatus according to the first embodiment of the present invention.

FIG. 7A is a view for explaining the arrangement of the material suppliers of the three-dimensional laminating and shaping apparatus according to this embodiment, and is a front view when viewed from the side of the chamber 101. The material suppliers 103 include a plurality of material suppliers, that is, the material supplier 131 (first material supplier), material supplier 132 (second material supplier), material supplier 133 (third material supplier), and material supplier 134 (fourth material supplier).

Figure 7B:
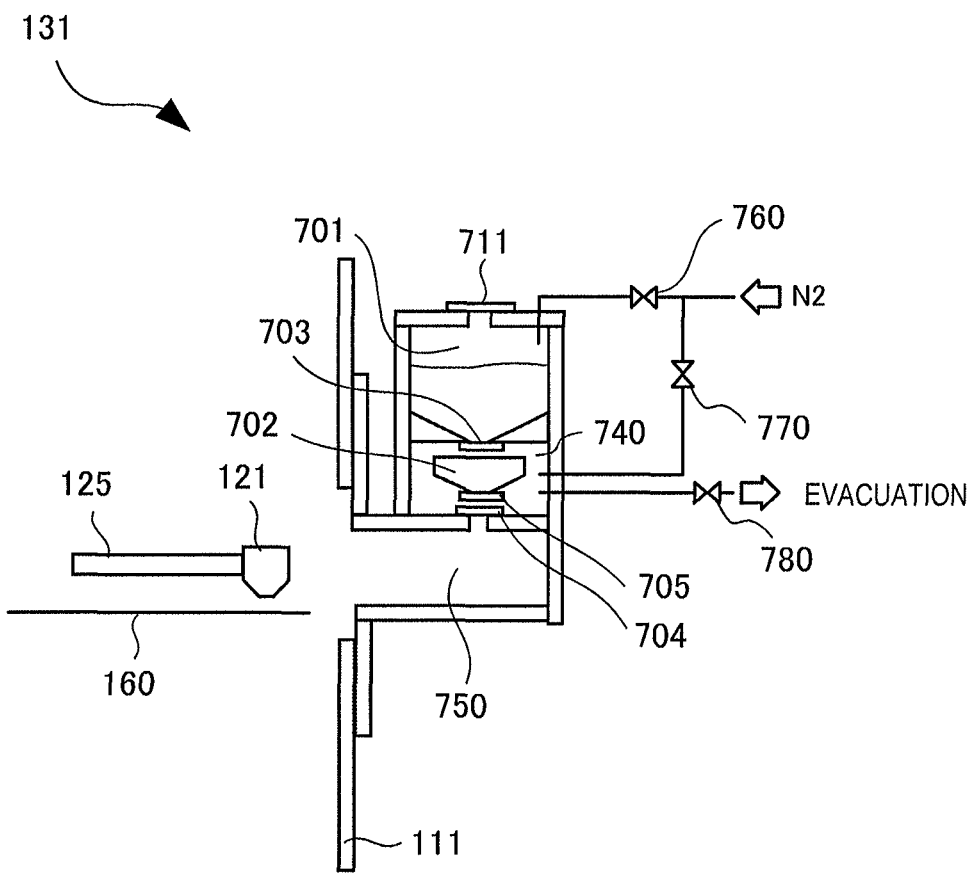
FIG. 7B is a view for explaining the arrangement of each material supplier of the three-dimensional laminating and shaping apparatus according to the first embodiment of the present invention.

FIG. 7B is a view for explaining the arrangement of each material supplier of the three-dimensional laminating and shaping apparatus according to this embodiment, and is a schematic side sectional view showing the material supplier 131. The material supplier 131 is attached to a chamber wall 111 of the chamber 101, and includes a material storage 701, an intermediate material storage 702, and valves 703, 704, and 705. The chamber 101 is evacuated. Note that the cartridge 121 will be exemplified here but the same applies to the remaining cartridges 122, 123, and 124.

In the chamber 101, the cartridge 121 that spreads the material 171 on the shaping surface 160 exists above the shaping surface 160, and is held by the cartridge holder 125. Since the cartridge holder 125 is attached to the Y-direction stage 162 (not shown), and the Y-direction stage 162 is attached to the X-direction stage 161, the material 171 can be two-dimensionally spread on the shaping surface 160. The cartridge 121 can store a predetermined amount of the material 171. However, the cartridge 121 cannot store a necessary amount of the material 171 for shaping the three-dimensional laminated and shaped object 180, and needs to be supplied with a shortage of the material 171, as needed.

In the material supplier 131, the material storage 701 is provided upstream, and the intermediate material storage 702 is provided downstream of the material storage 701. The valve 703 (first valve) is provided between the material storage 701 and the intermediate material storage 702, and connection or disconnection between the material storage 701 and the intermediate material storage 702 can be controlled by controlling opening/closing of the valve 703.

If the valve 703 is opened, the material 171 stored in the material storage 701 drops downward, thereby making it possible to supply the material 171 to the intermediate material storage 702. Note that since the lower portion (bottom portion) of the material storage 701 has a tapered shape, the material 171 naturally drops downward by its own weight by only opening the valve 703, thereby making it possible to supply the material 171 to the intermediate material storage 702.

Although an upper portion of the material storage 701 has a hole for external replenishment of the material 171, this hole is generally sealed by a sealing cover 711. For example, an introduction pipe for introducing an inert gas such as nitrogen ($N_2$) is attached to the material storage 701, and the inert gas can be introduced by opening/closing an opening/closing valve 760. The material storage 701 is generally filled with the inert gas such as nitrogen to prevent contamination of the stored material 171.

The intermediate material storage 702 is provided in an exchange chamber 740, and temporarily stores the material 171 supplied from the material storage 701. Similarly to the material storage 701, since a lower portion (bottom portion) of the intermediate material storage 702 has a tapered shape, the material 171 can be supplied to the cartridge 121 by controlling opening/closing of each of the valves 704 and 705.

A pipe for introducing an inert gas such as nitrogen is attached to the intermediate material storage 702, and the inert gas can be introduced to the intermediate material storage 702 by opening/closing an opening/closing valve 770. An evacuation pipe is also attached to the intermediate material storage 702, and the intermediate material storage 702 can be evacuated by opening/closing an opening/closing valve 780. The material 171 temporarily stored in the intermediate material storage 702 naturally drops downward by its own weight by opening the valves 704 and 705, thereby making it possible to supply the material 171 to the cartridge 121.

Material supply by the material supplier 131 of the three-dimensional laminating and shaping apparatus 100 according to this embodiment will be described with reference to FIGS. 8A to 8D. FIGS. 8A to 8D are views each for explaining a state of material supply by each material supplier of the three-dimensional laminating and shaping apparatus according to this embodiment. Note that the material supplier 131 will be exemplified here but the same applies to the remaining material suppliers 132, 133, and 134.

As shown in FIG. 8A, in a state in which the cartridge 121 has spread a predetermined amount of the material 171 on the shaping surface 160, the material storage 701 is filled with the inert gas. In this state, the intermediate material storage 702 stores no material 171. All of the valves 703, 704, and 705 are closed. Furthermore, the opening/closing valves 760 and 770 are open, and the opening/closing valve 780 is closed. Therefore, since the opening/closing valves 760 and 770 are open, the material storage 701 and the intermediate material storage 702 have the same atmosphere.

Figure 8B:
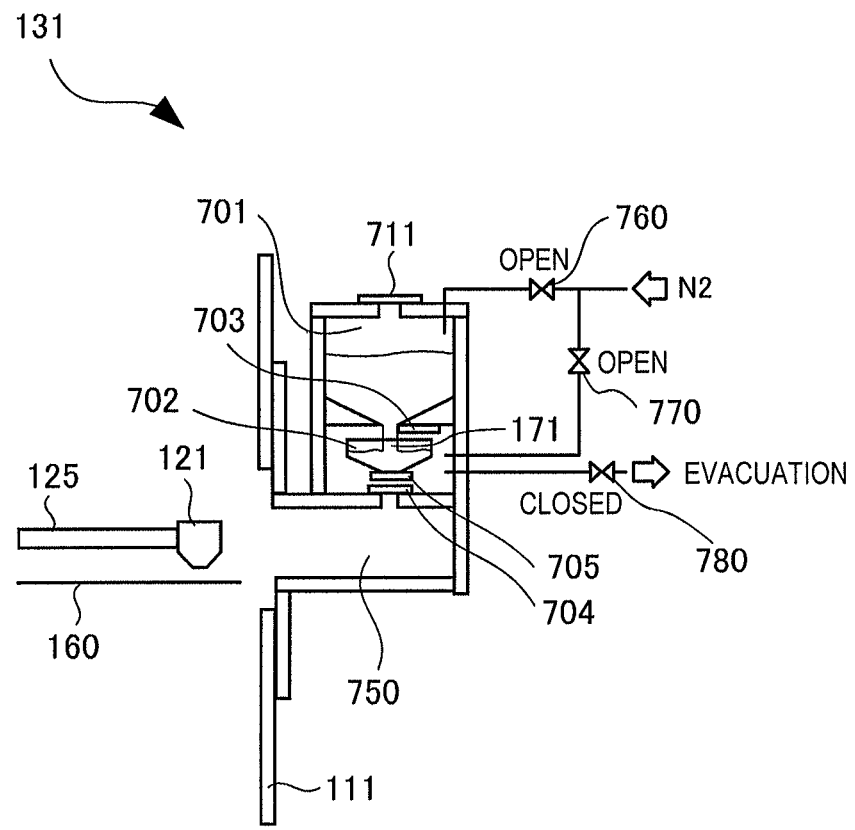
FIG. 8B is a view for explaining a state of material supply by each material supplier of the three-dimensional laminating and shaping apparatus according to the first embodiment of the present invention.

As shown in FIG. 8B, if the valve 703 is opened, the material 171 stored in the material storage 701 drops downward, and is supplied to the intermediate material storage 702, thereby replenishing the intermediate material storage 702 with a necessary amount of the material 171.

Figure 8C:
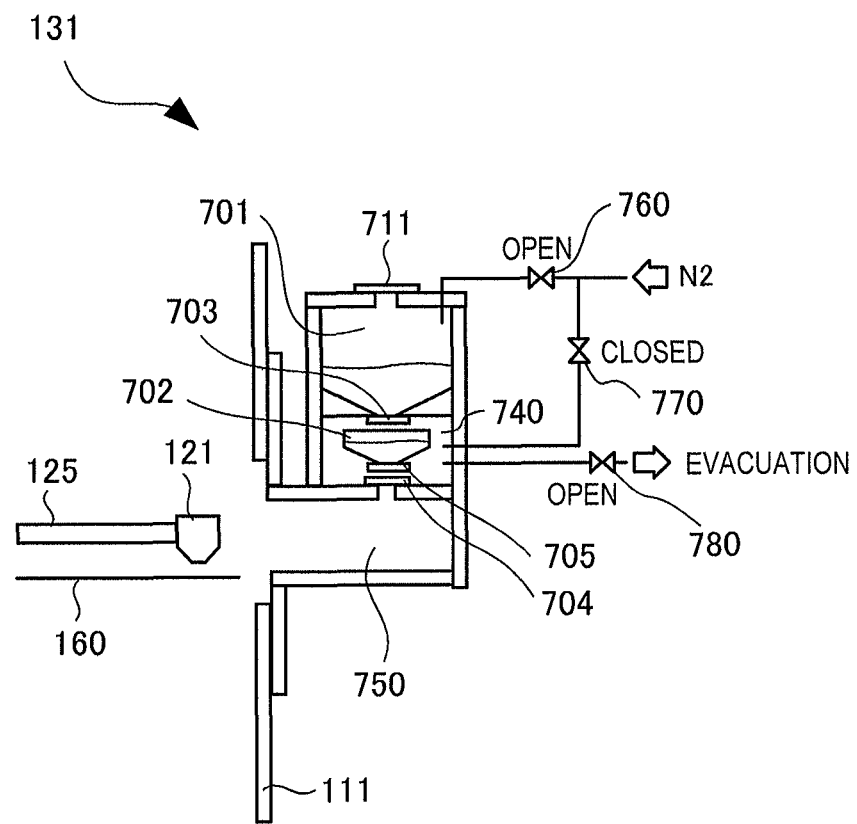
FIG. 8C is a view for explaining a state of material supply by each material supplier of the three-dimensional laminating and shaping apparatus according to the first embodiment of the present invention.

As shown in FIG. 8C, the valve 703 is closed to stop supplying the material 171, and the opening/closing valve 780 is opened to evacuate the exchange chamber 740. The exchange chamber 740 is continuously evacuated until the degree of vacuum of the exchange chamber 740 becomes equal to that of the chamber 101.

Figure 8D:
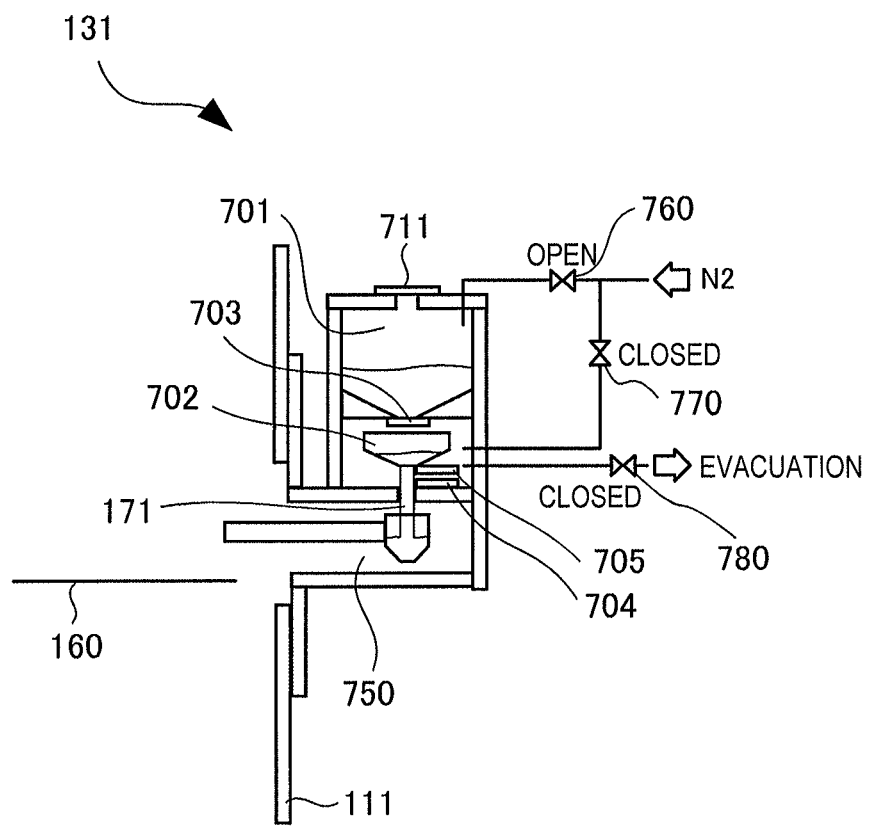
FIG. 8D is a view for explaining a state of material supply by each material supplier of the three-dimensional laminating and shaping apparatus according to the first embodiment of the present invention.

As shown in FIG. 8D, if evacuation of the exchange chamber 740 is complete and the degree of vacuum of the exchange chamber 740 is equal to that of the chamber 101, the valves 704 and 705 are opened. Then, the material 171 stored in the intermediate material storage 702 drops downward by its own weight, and is supplied to the cartridge 121 which stands by at a cartridge standby position 750. Even if the cartridge 121 has a small allowable amount of the material 171, it is possible to replenish the cartridge 121 with the material 171, as needed, and thus shape the three-dimensional laminated and shaped object 180.

Note that the exchange chamber 740 may be evacuated while the cartridge 121 spreads the material 171. It is possible to shorten the shaping time of the three-dimensional laminated and shaped object 180 by replenishing the intermediate material storage 702 with the material 171 and evacuating the exchange chamber 740 while the cartridge 121 spreads the material 171.

According to this embodiment, it is possible to shape a three-dimensional shaped object using a plurality of different materials, and implement replenishment of the materials during shaping without stopping the apparatus. If the number of cartridges is increased, it is possible to execute multicolored printing in correspondence with the number of cartridges. In addition, since the intermediate material storage is provided in the material supplier, and its degree of vacuum is set in advance to be equal to that of the chamber by performing atmosphere adjustment, it is possible to shape a three-dimensional laminated and shaped object without stopping the operation of the three-dimensional laminating and shaping apparatus, thereby shortening the shaping time.

Second Embodiment

A three-dimensional laminating and shaping apparatus according to the second embodiment of the present invention will be described with reference to FIG. 9. FIG. 9 is a view for explaining the arrangement of a material supplier of the three-dimensional laminating and shaping apparatus according to this embodiment. The three-dimensional laminating and shaping apparatus according to this embodiment is different from that according to the first embodiment in that a bottle is included. The remaining components and operations are the same as those in the first embodiment. Hence, the same reference numerals denote the same components and operations, and a detailed description thereof will be omitted.

A material supplier 931 includes a bottle 901. For example, if a necessary amount of a material 171 for shaping a three-dimensional laminated and shaped object 180 is stored in the bottle 901, it is not necessary to newly replenish a material storage 701 with the material 171 during shaping.

According to this embodiment, since the bottle is provided in the material supplier, it is possible to continuously supply a predetermined amount of material to a cartridge. Furthermore, since it is not necessary to newly replenish the cartridge with the material during shaping, it is not necessary to stop the operation of the three-dimensional laminating and shaping apparatus, thereby shortening the shaping time.

Third Embodiment

A three-dimensional laminating and shaping apparatus according to the third embodiment of the present invention will be described with reference to FIG. 10. FIG. 10 is a view for explaining the arrangement of a material supplier of the three-dimensional laminating and shaping apparatus according to this embodiment. The three-dimensional laminating and shaping apparatus according to this embodiment is different from those according to the first and second embodiments in that a material conveyor is included. The remaining components and operations are the same as those in the first and second embodiments. Hence, the same reference numerals denote the same components and operations, and a detailed description thereof will be omitted.

A material supplier 1031 includes a material conveyor 1001. The material conveyor 1001 can, for example, continuously supply a material 171 to a material storage 701 by force feed or the like. Even if, therefore, a three-dimensional laminated and shaped object 180 requires a large amount of the material 171, it is possible to continue shaping without stopping the three-dimensional laminating and shaping apparatus for replenishment of the material 171, thereby shortening the shaping time.

According to this embodiment, since the material conveyor is provided in the material supplier, it is possible to continuously convey the material to a cartridge, and shorten the shaping time of the three-dimensional laminated and shaped object.

Fourth Embodiment

Figure 11:
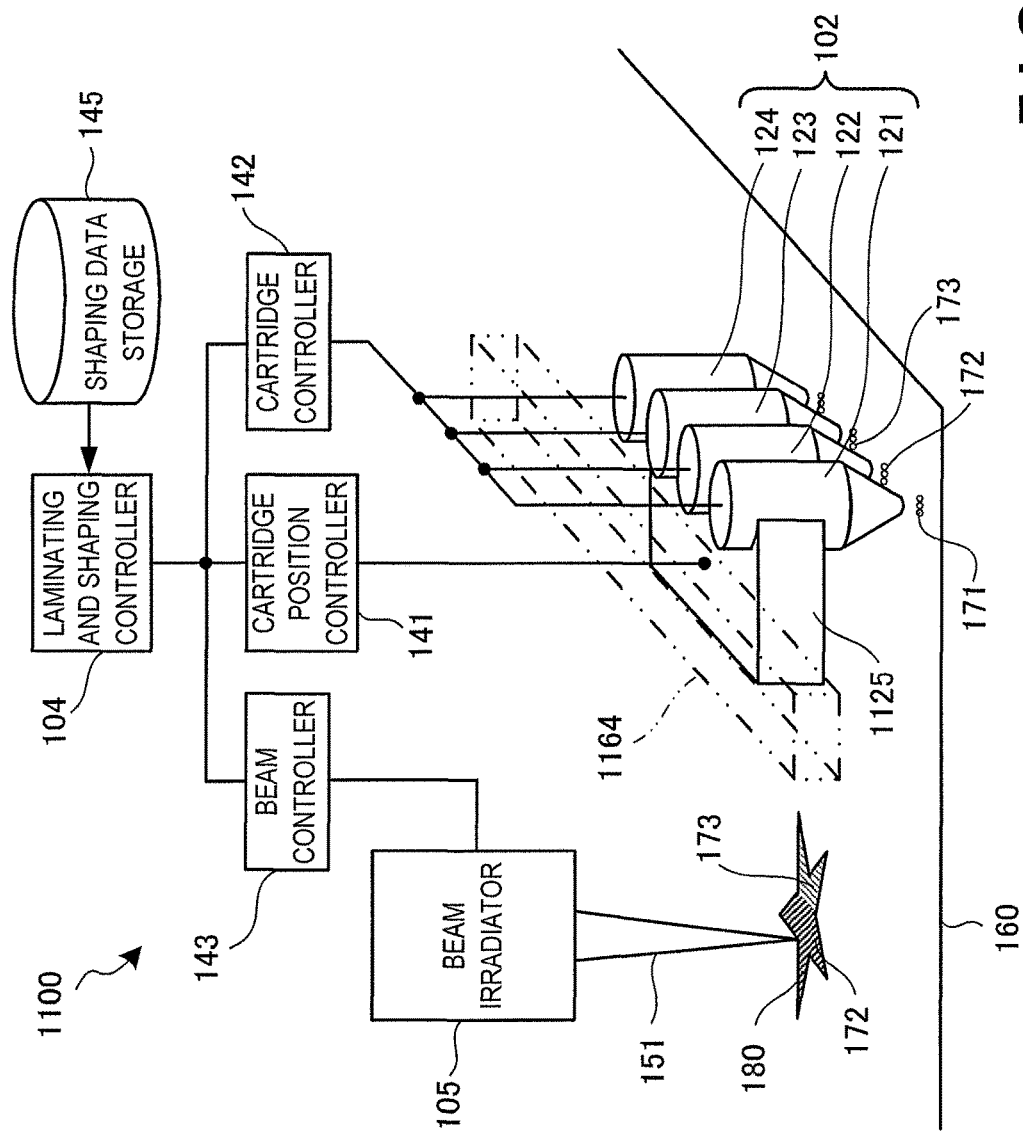
FIG. 11 is a block diagram showing the arrangement of a three-dimensional laminating and shaping apparatus according to the fourth embodiment of the present invention.

A three-dimensional laminating and shaping apparatus according to the fourth embodiment of the present invention will be described with reference to FIG. 11. FIG. 11 is a view for explaining the arrangement of a three-dimensional laminating and shaping apparatus according to this embodiment. A three-dimensional laminating and shaping apparatus 1100 according to this embodiment is different from that according to the first embodiment in that cartridges are replaceable. The remaining components and operations are the same as those in the first embodiment. Hence, the same reference numerals denote the same components and operations, and a detailed description thereof will be omitted.

Cartridges 121, 122, 123, and 124 are held by a cartridge holder 1125, and the cartridge holder 1125 is attached to an XY-direction rail 1164. The XY-direction rail 1164 drives the cartridge holder 1125 in the X and Y directions, that is, two-dimensionally. The cartridges 121, 122, 123, and 124 are filled with different types of materials 171, 172, 173, and 174, respectively. Note that the cartridges 121, 122, 123, and 124 may be filled with the same type of material, or some cartridges may be filled with the same type of material and the remaining cartridges may be filled with different types of materials.

The cartridges 121, 122, 123, and 124 are detachable from the cartridge holder 1125. Note that the cartridges 121, 122, 123, and 124 may be detachable one by one, or detachable as one set. Note that the number of cartridges is not limited to four, and need only be two or more.

According to this embodiment, since the cartridges are replaceable, the apparatus arrangement of the three-dimensional laminating and shaping apparatus is very simple. If replenishment of a material is necessary, the cartridge itself is replaced, and it is thus possible to largely shorten the material replenishment time.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
    a shaping chamber in which a three-dimensional laminated and shaped object is shaped;
    at least two material spreaders that are provided in said shaping chamber and spread materials of the three-dimensional laminated and shaped object;
    at least two material suppliers that supply the materials to said material spreaders, said at least two material suppliers being disposed outside of the shaping chamber;

a controller that controls movements of said material spreaders and said material suppliers; and a beam irradiator that irradiates the materials with a beam, wherein said material spreaders and said material suppliers are respectively paired, and wherein said controller controls the movements of said material spreaders and said material suppliers so that each of said material spreaders is supplied, at a predetermined timing, with the material from a paired one of said material suppliers, wherein each of said at least two material suppliers includes a material storage and an intermediate material storage provided in an exchange chamber downstream of the material storage, wherein said material storage and said exchange chamber are connected via a first valve, and said exchange chamber and said shaping chamber are connected via a second valve, and wherein the three-dimensional laminating and shaping apparatus further comprises:

(a) a valve controller that controls opening and closing of each of the first valve and the second valve, and (b) an atmosphere controller that controls an atmosphere in each of the exchange chamber and the shaping chamber.

2. The three-dimensional laminating and shaping apparatus according to claim 1, wherein said atmosphere controller controls evacuation of gas from the exchange chamber.

3. The three-dimensional laminating and shaping apparatus according to claim 1, wherein said atmosphere controller is capable of controlling the atmosphere in said exchange chamber and the atmosphere in said shaping chamber so that they are the same.

4. The three-dimensional laminating and shaping apparatus according to claim 1, wherein one of said material spreaders is configured and arranged for spreading a material on a first region which will not be irradiated with the beam according to a spread plan, and a second of said material spreaders is configured and arranged for spreading a material on a second region which will be irradiated with the beam according to the spread plan.

5. The three-dimensional laminating and shaping apparatus according to claim 1, wherein the beam is selected from the group consisting of an electron beam, a laser beam, and an ion beam.

6. The three-dimensional laminating and shaping apparatus according to claim 1, wherein the beam is selected from the group consisting of a continuous beam and a pulse beam.

7. A method for controlling the three-dimensional laminating and shaping apparatus according to claim 1, the method comprising the step of:

controlling the movements of the material spreaders so that each of the material spreaders is supplied, at a predetermined timing, with the material from a paired one of the material suppliers.

8. A non-transitory computer readable medium storing a program for controlling the three-dimensional laminating and shaping apparatus according to claim 1, the control program, when executed by at least one processor, performing a method comprising the step of:

controlling the movements of the material spreaders so that each of the material spreaders is supplied, at a predetermined timing, with the material from a paired one of the material suppliers.

9. The three-dimensional laminating and shaping apparatus according to claim 1, further comprising (a) first means, comprising a third valve, for regulating a flow of a first gas into the material storage;

(b) second means, comprising a fourth valve, for regulating a flow of a second gas into the exchange chamber; and (c) third means, comprising an evacuation valve, for regulating an evacuation of gas from the exchange chamber;

wherein the material storage, the exchange chamber with intermediate storage, the shaping chamber, the first and second valves, the first, second and third means and the evacuation valve are configured and arranged such that (i) with the first and second valves closed and the third and fourth valves open, the first and second gases are insertable into the material storage and exchange chamber respectively to bring respective atmospheres in the material storage and exchange chamber into equilibrium; (ii) with the first valve open, material stored in the material storage passes to the intermediate material storage in the exchange chamber; (iii) with the first and second valves closed and the evacuation valve open, the second gas in the exchange chamber can be evacuated to bring a degree of vacuum in the exchange chamber into equilibrium with a degree of vacuum in the shaping chamber; and (iv) with the second valve open, material stored in the intermediate material storage in the exchange chamber can pass to the shaping chamber when the degree of vacuum in the exchange chamber and in the shaping chamber has been brought into equilibrium.

* * * * *